Aug. 28, 1951   J. B. BOYETT, SR   2,565,587
MOBILE SPRAYING MACHINE
Filed June 12, 1950   6 Sheets-Sheet 1
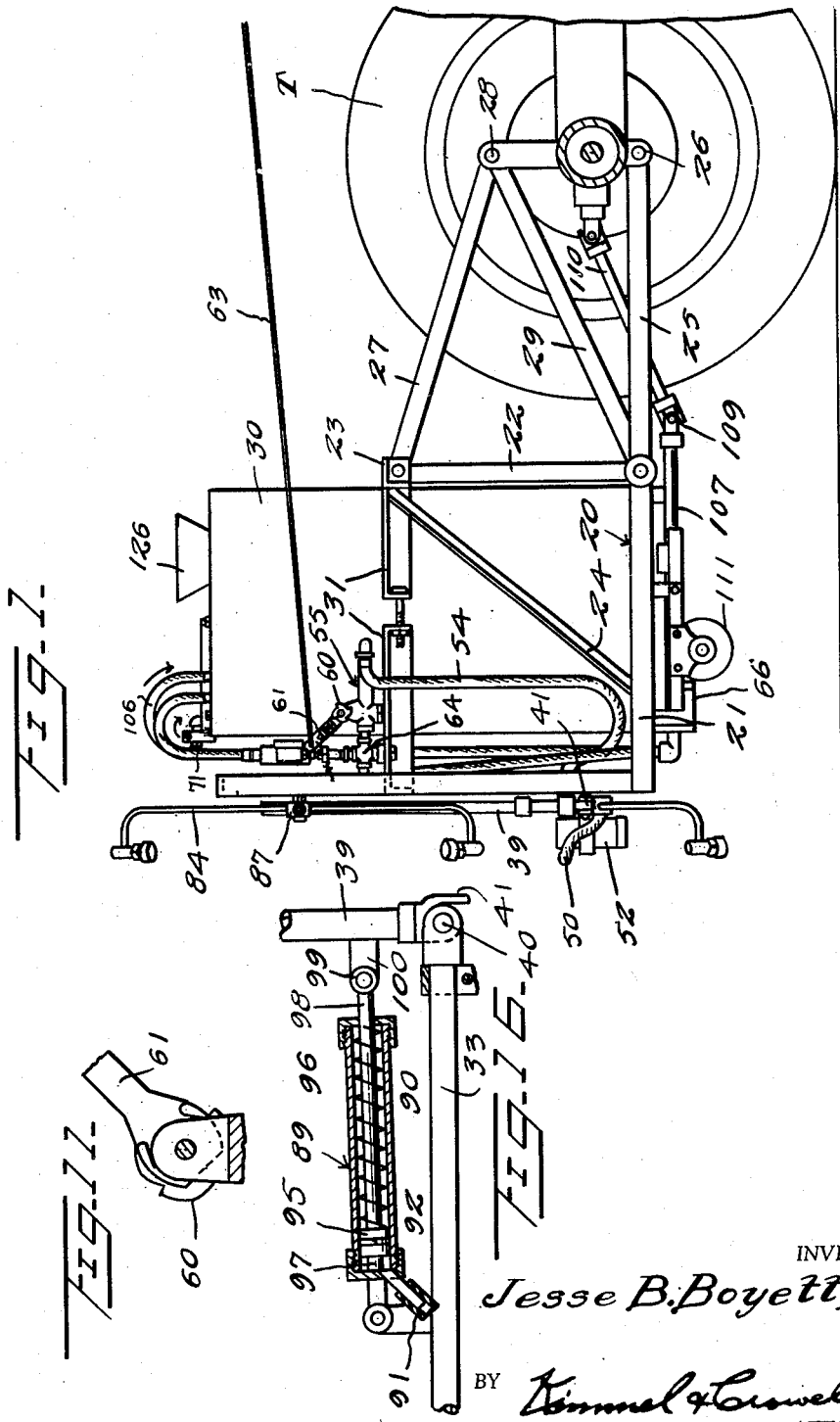
INVENTOR
Jesse B. Boyett, Sr.
BY
Kimmel & Crowell
ATTORNEYS

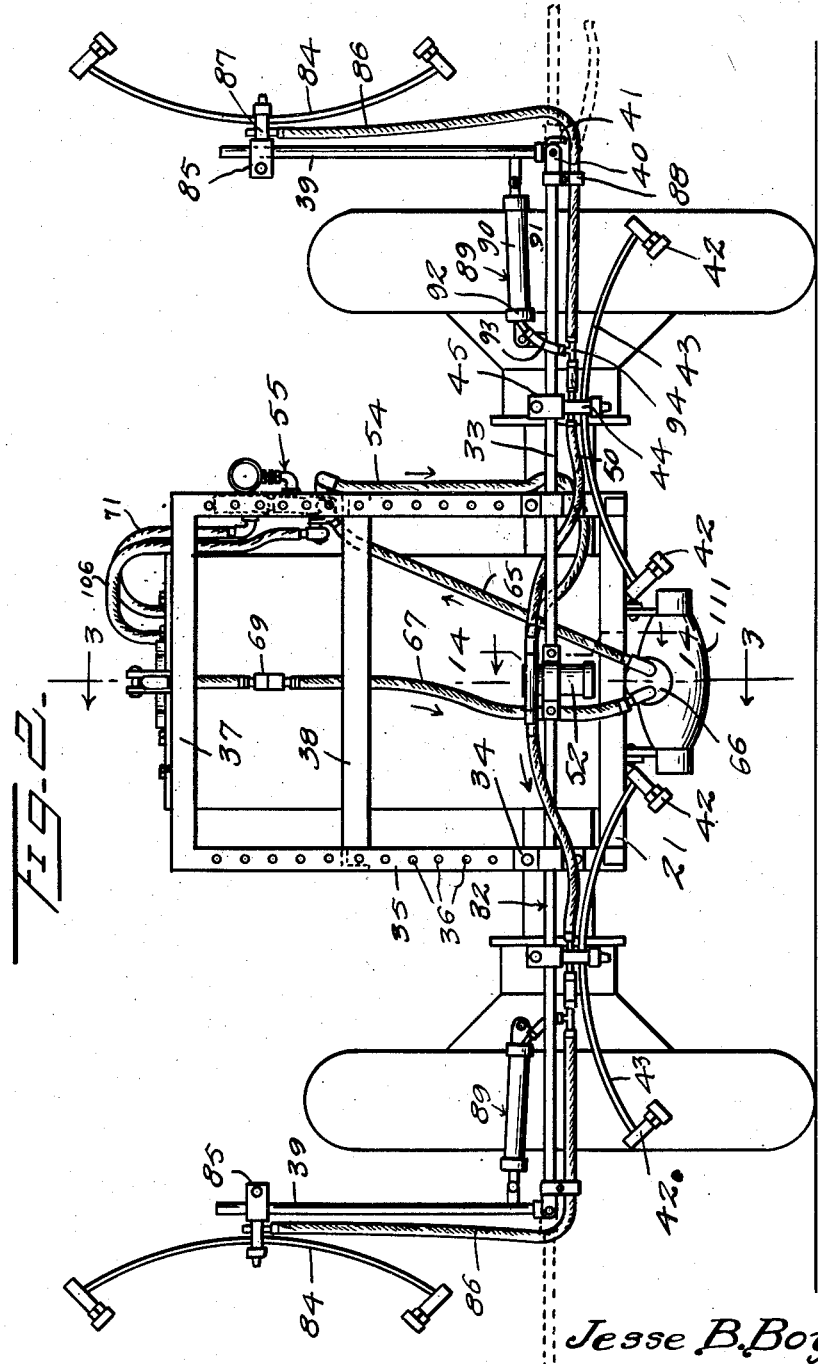

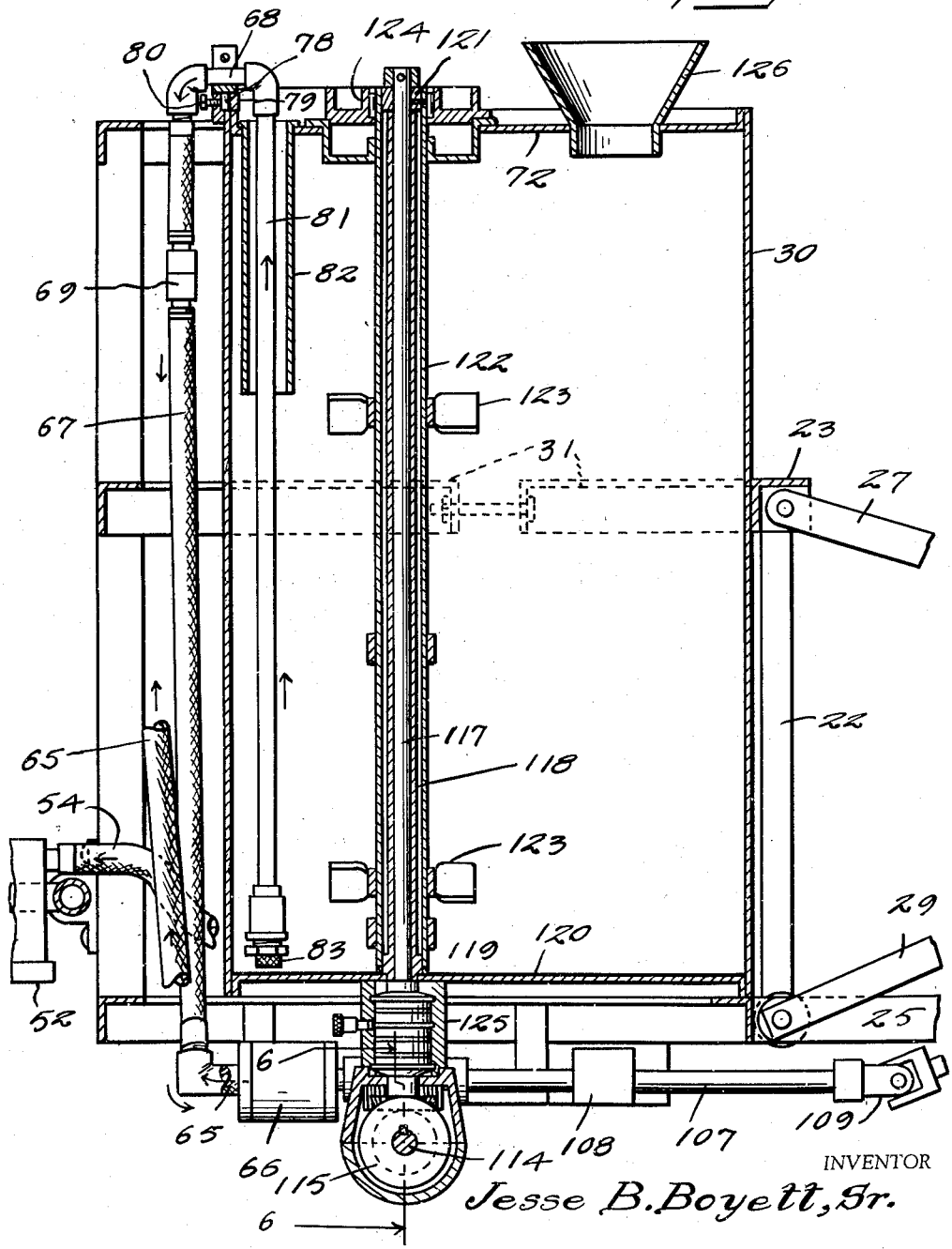

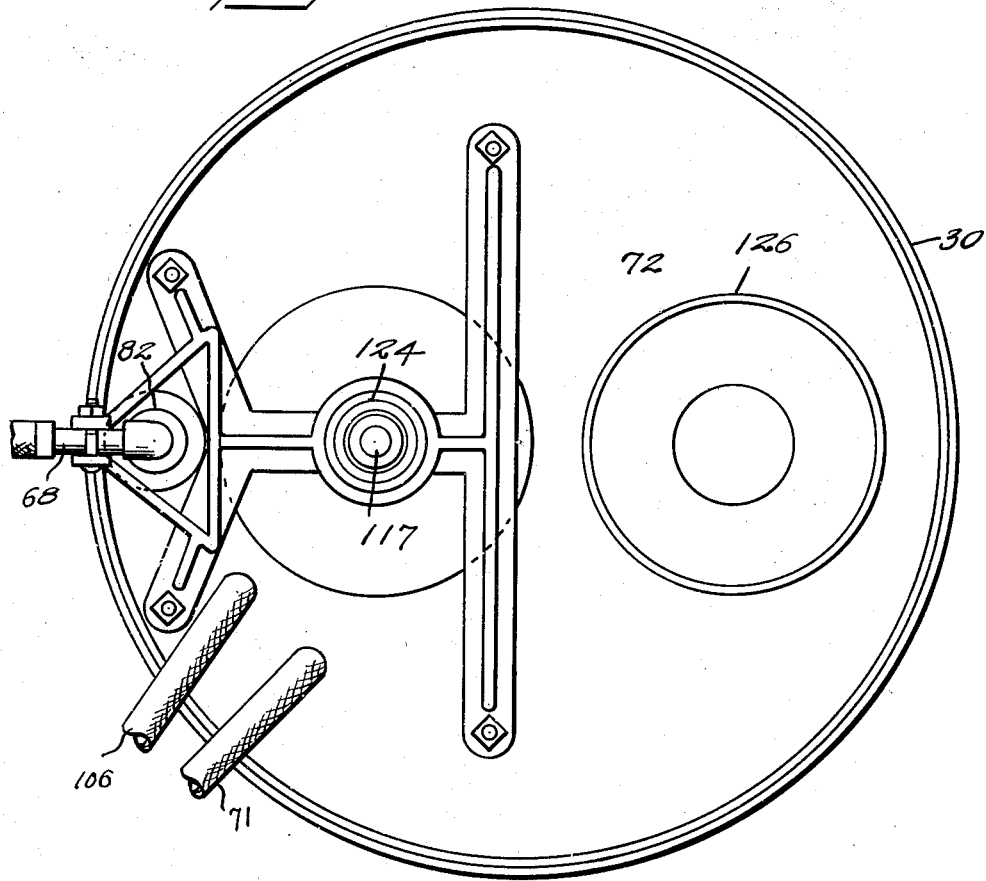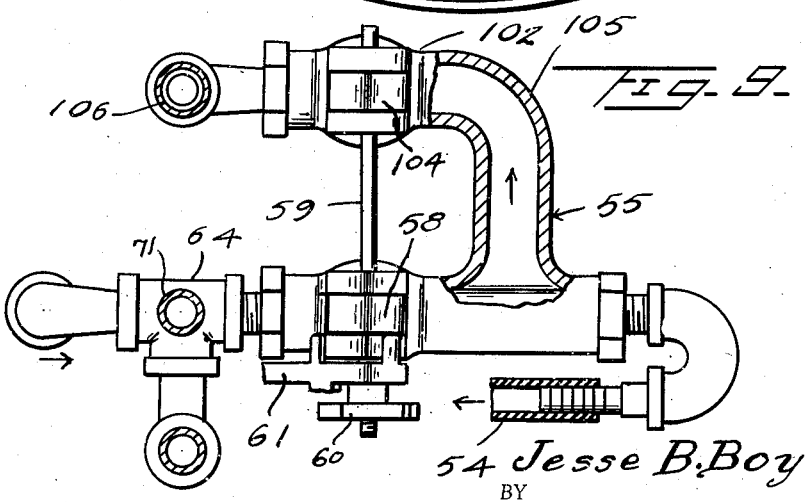

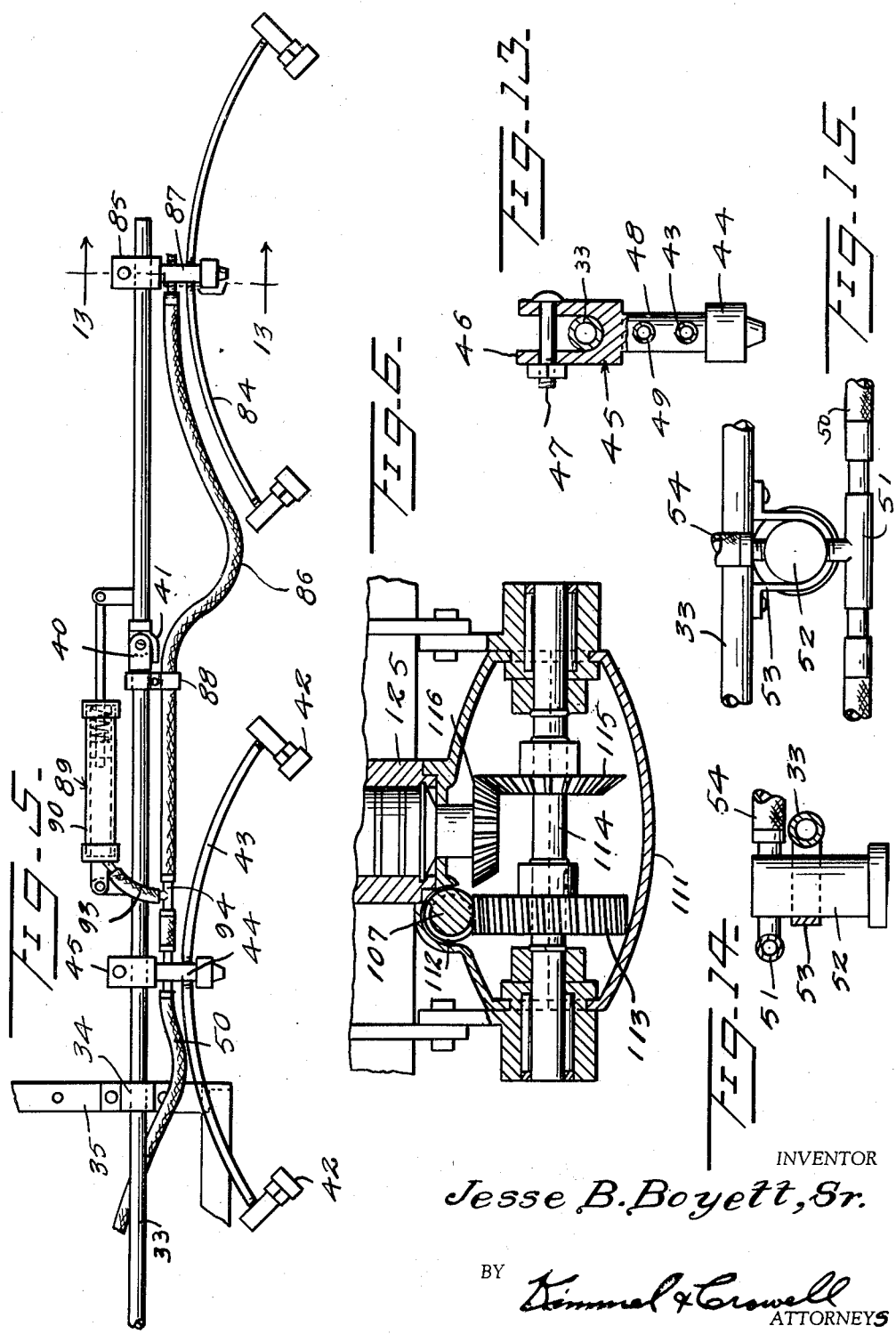

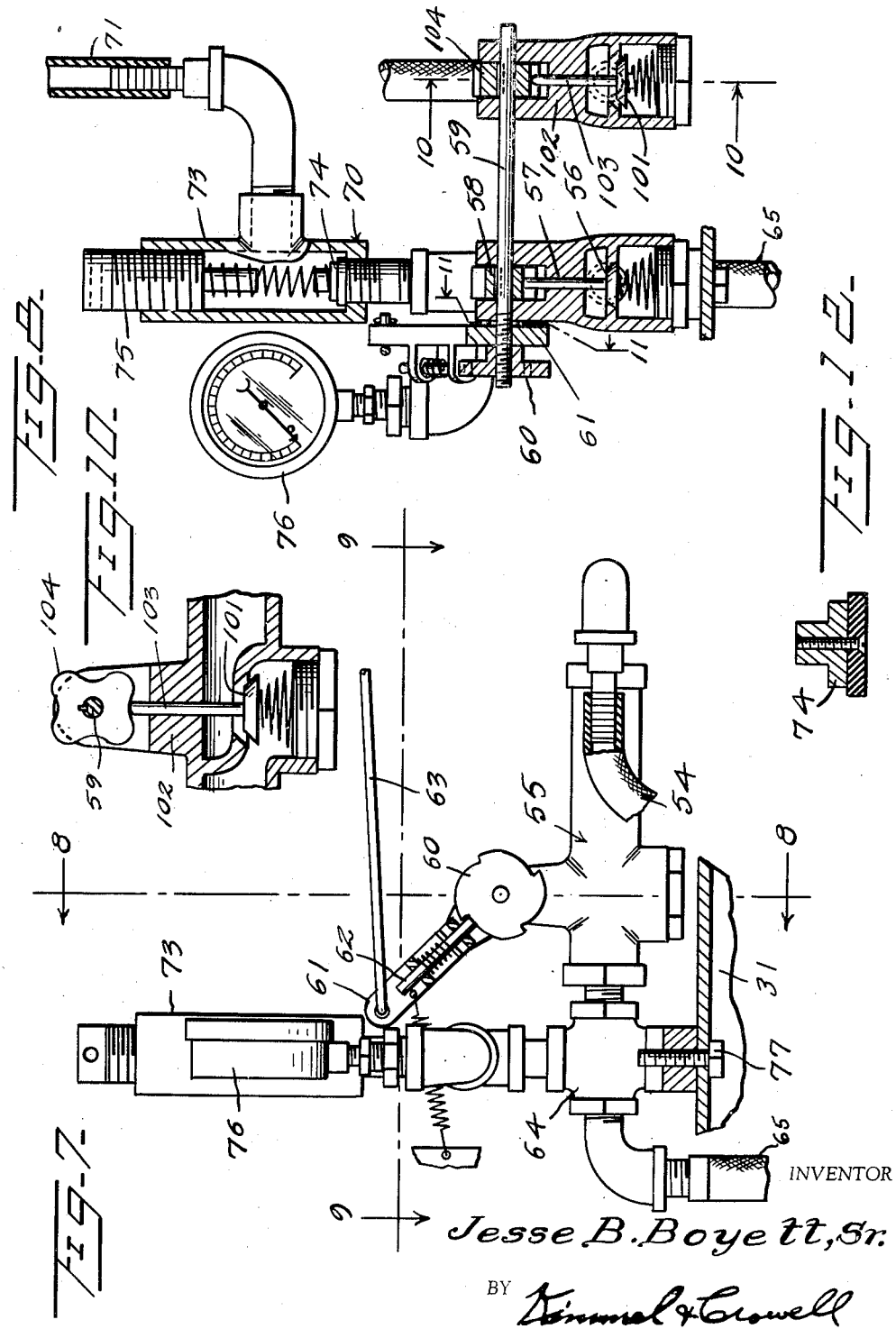

Patented Aug. 28, 1951

2,565,587

UNITED STATES PATENT OFFICE 2,565,587

MOBILE SPRAYING MACHINE

Jesse B. Boyett, Sr., Nashville, Ga.

Application June 12, 1950, Serial No. 167,623

5 Claims. (Cl. 299—41)

This invention relates to a mobile spraying machine, and is an improvement over the structure embodied in my copending application, Serial No. 46,430, filed August 28, 1948, for Mobile Spraying Machine.

An object of this invention is to provide an improved spraying machine embodying an automatically operable boom structure wherein the outer portions of the boom are extendible and collapsible.

Another object of this invention is to provide a boom structure of this kind wherein the extendible portions of the boom are moved to extended position when pressure is applied to the spray nozzles, and the extended portions of the boom are automatically returned to collapsed position when pressure is released on the spray nozzles.

Another object of this invention is to provide a mobile spraying machine which includes means for rigidly mounting the device on the rear of the tractor with the frame of the device substantially parallel with the ground.

A further object of this invention is to provide an improved drive means for a spraying unit of this kind and an improved arrangement of the pressure applying means so as to provide for a minimum of flexible hose connections.

A further object of this invention is to provide in a device of this kind an improved agitator which permits the use of high and low pressures with the nozzles so that various types of insecticides may be used.

A further object of this invention is to provide an adjustable boom structure which will permit the vertical and horizontal adjustment of the boom and the nozzles on the boom so that various widths of rows may be sprayed, and the device may be used during the growing of the plants.

A further object of this invention is to provide a device of this kind which permits the use of various types and assemblies of nozzles so that the plants may be sprayed from various angles.

Another object of this invention is to provide a spraying machine of this type embodying a single control for operation of the spraying mechanism.

A still further object of this invention is to provide a device of this kind which may derive power for operation thereof from the power take-off of the tractor or may derive power from an independent power member.

With the above and other objects in view, my invention consists in the arrangement, combination and details of construction disclosed in the drawings and specification, and then more particularly pointed out in the appended claims.

In the drawings:

Figure 1 is a detailed side elevation of a spraying machine constructed according to an embodiment of this invention showing the machine mounted on the rear of a tractor of conventional construction, the tractor being shown partly in section and broken away.

Figure 2 is a detailed rear elevation of the device.

Figure 3 is a fragmentary sectional view taken on the line 3—3 of Figure 2.

Figure 4 is a fragmentary plan view of the device.

Figure 5 is a fragmentary rear elevation of the boom structure in extended position.

Figure 6 is a fragmentary sectional view taken on the line 6—6 of Figure 3.

Figure 7 is a detailed side elevation partly broken away and in section of the spray control unit.

Figure 8 is a fragmentary sectional view taken on the line 8—8 of Figure 7.

Figure 9 is a fragmentary sectional view taken on the line 9—9 of Figure 7.

Figure 10 is a fragmentary sectional view taken on the line 10—10 of Figure 8.

Figure 11 is a fragmentary sectional view taken on the line 11—11 of Figure 8.

Figure 12 is a fragmentary sectional view of a pressure relief or safety valve.

Figure 13 is a sectional view taken on the line 13—13 of Figure 5.

Figure 14 is a fragmentary sectional view taken on the line 14—14 of Figure 2.

Figure 15 is a fragmentary plan view of the central portion of the boom showing the filter.

Figure 16 is a fragmentary front elevation partly in longitudinal section showing the operating means for extending and collapsing the ends of the boom.

Referring to the drawings, the numeral 20 designates generally a frame structure embodying a base frame 21 with a pair of upright rear frame members 22 and a cross frame member 23 secured to the upper ends of the uprights 22. Downwardly and rearwardly inclined bracing members 24 are connected between the upper frame members 23 and the base frame 21. The frame 20 is adapted to be supported in rearwardly extended position from a tractor T by means of a pair of supporting bars 25 secured to the frame 20 and extending forwardly therefrom.

The bars 25 are adapted to be connected as indicated at 26 to the rear portion of the tractor. A pair of bracing bars 27 are secured to the upper rear bar 23 being extended downwardly and forwardly and are connected as indicated at 28 to a suitable portion of the tractor T.

A pair of additional supporting and bracing members 29 are connected at their rear ends to the lower portion of the frame 20 and extended upwardly and forwardly for connection as indicated at 28 to a suitable portion of the tractor T. The supporting members 25, 27, and 29 are adapted to rigidly support the frame 20 in substantially parallel relation with respect to the ground. A tank or reservoir 30 is mounted on the base 21 being clamped in the frame structure by clamping means 31. An elongated horizontally disposed boom generally designated as 32 is disposed at the rear of the frame 20 and comprises a boom bar 33 which is secured by clamping means 34 to a pair of upright boom supporting bars 35.

The boom supporting bars 35 are formed with a plurality of vertically spaced openings 36 so that the clamping members 34 may be vertically adjusted to thereby vertically adjust the boom bar 32. The uprights 35 are connected together by means of an upper connecting bar 37 and an intermediate connecting bar 38. The uprights 35 are fixed relative to the clamping means 31 so that these uprights will be rigidly disposed in vertical position.

The boom bar 32 includes outer extensible boom members 39 pivotally secured as at 40 to the outer ends of the bar 33. The extension bars 39 when in collapsed position are disposed in a vertical position as shown in Figure 2 and when in operative position are disposed in a horizontal position, being limited as to their downward swinging movement by stop means 41.

A plurality of spray members are secured to the boom 32 and as herein disclosed the boom bar 33 has two pairs of spray nozzles 42 secured thereto, and each pair of nozzles 42 are secured to a longitudinally bowed pipe 43 so that the spray from the nozzle 42 will be disposed in downwardly convergent relation. It will be understood that the nozzles 42 may be adjusted to any desired angular position with respect to the boom bar 33 so that the spray may be directed downwardly to opposite sides of the plant or, if desired, the nozzles may be swung upwardly to direct the spraying at any other suitable angle. A centrally disposed nozzle 44 is connected with the pipe 43 for directing a spray downwardly between the spray emanating from the nozzles 42. Each spray unit comprising a pair of nozzles 42 and the central nozzle 44 mounted on the pipe 43 is adjustably secured to the boom bar 33 by means of a clamping member 45. The clamping member 45 as shown in Figure 13 embodies a pair of clamping arms 46 which are adjusted by means of a clamping bolt 47 so as to position the spray unit in a selected position along the length of the boom bar 33 and also to position the spray unit at a pre-determined spraying angle.

The central nozzle 44 is secured to a housing 48 which is fixed relative to the clamping member 45. The housing 48 includes a pair of oppositely extending nipples 49 with which a flexible hose 50 is connected. The hose 50 is extended inwardly and is connected to a T 51 which is secured to a filter member 52. The filter member 52 is secured to the forward side of the boom bar 33 by means of a clamping yoke 53.

The insecticide is discharged under pressure into the filter 52 from a flexible hose 54 which is connected to the control unit generally designated as 55. The control unit 55 includes a spring pressed regulating valve 56 which is normally urged to closed position, and the valve 56 embodies a stem 57 projecting upwardly for engagement with a cam 58. The cam 58 is mounted on a cam shaft 59, and a ratchet 60 is secured to one end of the shaft 59.

A rock lever 61 is loosely mounted on the shaft 59 and has a spring pressed pull 62 secured to one side thereof adapted to engage the ratchet 60 so as to provide for rotation of the cam shaft 59 in one direction. The lever 61 comprises the single control means for regulating the spraying of the insecticide and has one end of a flexible operating member 63 secured thereto.

The operating member 63 is adapted to be extended forwardly to a position convenient to the operator of the tractor. The control unit or valve assembly 55 has a T coupling 64 connected with the intake side thereof, and a flexible hose 65 is connected with the T 64 and is connected to the outlet side of a pump 66. The intake side of the pump 66 is connected by means of a hose 67 to a fitting 68 disposed at the top of the tank or reservoir 30. Preferably the hose 67 includes an interposed detachable connection 69 of the quick detachable type so that if desired the suction hose 67 may be uncoupled from the fitting 68 and may be extended into a second tank containing insecticide for pumping the insecticide into the tank 30.

The coupling 64 has extending upwardly therefrom a pressure relief valve structure 70 which is connected by means of a hose 71 to the tank 30. The hose 71 is extended through the top wall 72 of the tank 30 at a convenient location. The relief valve 70 includes a housing 73 with a spring pressed valve member 74 normally urged to closed position and tensioned by means of a tensioning plug 75. A pressure gauge 76 is interposed between the relief valve structure 70 and the coupling 64. As shown in Figure 7 the coupling 64 is secured by a fastening means 77 to the clamping member 31. The fitting 68 includes a pin or stud 78 engaging in a block 79 which is fixed on the top wall 72.

The stud or pin 78 is secured in position by means of a set screw 80 so that the fitting 68 may be readily removed from the top of the tank 72. The fitting 78 includes a downwardly extending suction pipe 81 projects loosely through a tube 82 which depends from the top wall 72. The suction pipe 82 is extended to the lower portion of the tank 30 and includes a screen 83 for screening the insecticide which is drawn upwardly through the pipe 81. By means of the mounting including the stud 78 and the block 79 the suction unit embodying the pipe 81 and the fitting 68 may be readily withdrawn from the tank 30 for cleaning the screen 83 or for other purposes.

The boom extension members 39 are each provided with at least one spray unit 84 which is similar in every detail to the unit including the spray nozzles 42 and 44 and the supporting pipe 43.

The unit 84 is adjustably clamped to the extension bar 39 by a clamping means 85 similar to the clamping means 45. A flexible hose 86 is connected to the manifold or housing 87 similar to the manifold or housing 48 so that the insecticide will be delivered to the spraying unit 84. A clamping bracket 88 is secured to the outer portion of the boom bar 43 for rigidly holding that portion of the flexible hose 86 which is disposed adjacent the joint between the boom bar 43 and the extension bar 39.

In order to provide a means whereby the extension bar 39 will be swung outwardly to a substantially horizontal extended and operating position, I have provided a hydraulic unit generally designated as 89. The hydraulic unit 89 includes a cylinder 90 which is rockably carried by a lug 91 fixed to the bar 33. The inner end or head 92 of the cylinder 90 is connected by means of a flexible connection 93 to a T coupling 94 which is interposed in the hose 86. The hydraulic member 89 includes a plunger 95 slidable in a cylinder 90 and constantly urged inwardly by means of a spring 96. The plunger 95 includes a stop member 97 which is adapted to engage the inner head 92 so that the plunger 95 will be held against contact with the inner end of the head 92 in order that liquid under pressure may be discharged into the cylinder 90. The plunger 95 includes a plunger rod 98 which is pivotally connected as at 99 to a lug 100 fixed to the extension bar 39 providing the connection 91 between the hydraulic member 89, and the hose 86. When fluid pressure is disposed in the spray line, plunger 95 will be forced outwardly so that extension member 39 will be swung outwardly and downwardly at a substantially horizontal operative and spraying position. When pressure is released in the spraying lines spring 96 will return extension member 39 to an upright and substantially inoperative position.

At the time the control valve 56 is disposed in closed position a second valve 101 disposed in a housing 102 is moved to an open position. The valve 101 is spring pressed to a closed position and includes a stem 103 which is engageable with a cam 104 mounted on the cam shaft 59.

The cam 104 is disposed at right angles to the cam 58 so that valve 101 will be disposed in closed position when valve 56 is open and will be disposed in open position when valve 56 is in closed position. The valve housing 102 is connected with the housing 55 by means of a connection 105, and the outlet side of the valve housing 102 is connected by means of a housing or tubular connection 106 to the top of the tank 30. In this manner the return of the extension members 39 to a vertical position is effected with return of the fluid to the tank 30.

A drive shaft 107 is journalled in bearings 108 secured to a frame member 21, and is connected to a power means through a universal joint 109 secured to a second shaft member 110. As herein disclosed the shaft member 110 is connected with the power take-off of a tractor. The shaft 107 extends through a gear housing 111 and has fixed thereon a worm 112 which meshes with a worm 113 secured to a right angularly disposed shaft 114.

The shaft 114 has fixed thereto a bevel gear 115 which meshes with a bevel gear 116 secured to the lower end of an agitator shaft 117. In the present instance the shaft 117 extends loosely and upwardly through a tubular member 118 which is fixed as at 119 to the bottom wall 120 of the tank 30. The upper end of the shaft 117 is fixedly secured as indicated at 121 to a tubular agitator shaft 122 which rotatably engages about the standpipe or tubular member 118. The tubular shaft 122 has fixed thereto a plurality of vertically spaced apart agitator blades 123. The upper end of the tubular shaft 122 is rotatably mounted in a bearing 124 which is fixed to the top wall 72 of the tank 30.

The lower end of the shaft 117 is journalled through a bearing 125 which is fixed to and extends downwardly from the bottom wall 120. The top wall 72 of the tank 30 has secured thereto a funnel or filler member 126 so that the insecticide may be discharged into the tank 30.

In the use and operation of this device the frame structure 30 is secured to the rear of the tractor T by means of the supporting bars 25, 27, and 29. Shaft member 110 is connected to the power take-off where such is available, although if desired shaft 107 may be driven by any suitable power means. Rotation of shaft 107 will operate pump 66 to draw out the insecticide in tank 30. As pressure is built up in the out-put line 65 connected with pump 66 and with valve member 56 in open position the liquid will flow to filter 52, and from filter 52 the liquid will flow in opposite directions through the oppositely extending hose members 50 which are connected with the T 51. The fluid pressure will be discharged through the nozzles 42 and will enter the cylinder 90 so that extension members 39 will be promptly swung downwardly to a substantially horizontal operative and spraying position. When the spraying operation has been completed, forward pull on operator 63 will release valve 56 for movement to closed position, and at this time return valve 101 will be moved by cam member 104 to an open position.

With valve member 101 in an open position spring 96 in cylinder 90 will move plunger 95 inwardly and latch extension member 39 to a substantially vertical inoperative position. Where it is desired to fill the tank 30 by means of the suction line 67 coupling 69 is broken, and suction line 67 is extended into the supply tank. At this time valve member 56 will be disposed in closed position so that upon operation of pump 66 the liquid will not pass through the valve member 55, but will flow upwardly through connection 64 and move relief valve 74 to an open position. If desired, the spring tension on valve 74 may at this time be reduced.

What is claimed is:

1. A spraying machine for attachment to a tractor comprising a frame, means supporting said frame from the tractor, a tank carried by said frame, a horizontal boom fixed to the rear of said frame, boom extensions pivotally carried by the opposite ends of said boom, spray members carried by said boom, connections between said spray members, spray members carried by said boom extensions, a pump connected between said tank and said spray members, and fluid pressure operated means interposed in the connection between certain of said spray members and connected between said boom and said extensions for swinging said extensions to horizontal operative position, said fluid pressure operated means including spring means for swinging said extensions to substantially vertical position when said pump is inoperative.

2. A spraying machine comprising a frame, a tank carried by said frame, a horizontal boom carried by said frame, spray means carried by said boom, boom extensions pivotally disposed at each end of said boom, spray means carried by said extensions, tubular connections between said spray means, a pump, a tubular connection between the suction side of said pump and said tank, a tubular connection between the outlet side of said pump and one of said first named connections, a normally closed spring-pressed valve in said latter connection, manually operable means for moving said valve to open position to open said connection between the outlet side of said pump and said connection between said spray means, and means connected between said extensions and said boom and communicating with said first named tubular connection for swinging said extensions downwardly to horizontal operative position under fluid pressure in said first named tubular connection.

3. A spraying machine comprising a frame, a tank on said frame, inner spray members fixed relative to said frame, outer spray members, swingable supporting means for said outer spray members carried by said frame, means connected between said tank and said inner and outer spray members for pumping insecticide from said tank for discharge from said spray members, and means active upon operation of said second named means for swinging said supporting means downwardly to horizontal operative position, said latter named means including spring means normally holding said supporting means in vertical collapsed position.

4. A spraying machine comprising a frame, a tank carried by said frame, a horizontal boom carried by said frame, spray means carried by said boom, boom extensions pivotally disposed at each end of said boom, spray means carried by said extensions, tubular connections between said spray means, a pump, a tubular connection between the suction side of said pump and said tank, a tubular connection between the outlet side of said pump and one of said first named connections, a normally closed spring-pressed valve in said latter connection, manually operable means for moving said valve to open position, means connected between said extensions and said boom and communicating with said first named tubular connection for swinging said extensions downwardly to horizontal operative position under fluid pressure in said first named tubular connection, a second normally closed valve connected to said manually operable means and connected between said pump and said tank whereby to connect said first tubular connection with said tank, said second valve being moved to open position when said first valve is closed whereby fluid in said tubular connections will be returned to said tank.

5. In a spraying device, a boom, pivoted extensions carried by the ends of said boom, spray means carried by said boom and said extensions, spring means normally holding said extensions in collapsed position at substantially right angles to said boom, means discharging insecticide from said spray means, and pressure operated means connected to said latter named means and to said extensions whereby to swing said extensions to an operative position substantially aligning with said boom.

JESSE B. BOYETT, Sr.

REFERENCES CITED

The following references are of record in the file of this patent:

UNITED STATES PATENTS

| Number | Name | Date |
|---|---|---|
| 2,221,433 | Pitner | Nov. 12, 1940 |